Feb. 27, 1968  C. GOODACRE  3,370,668
MOTOR DRIVEN TRUCKS
Filed Feb. 2, 1966  4 Sheets-Sheet 1

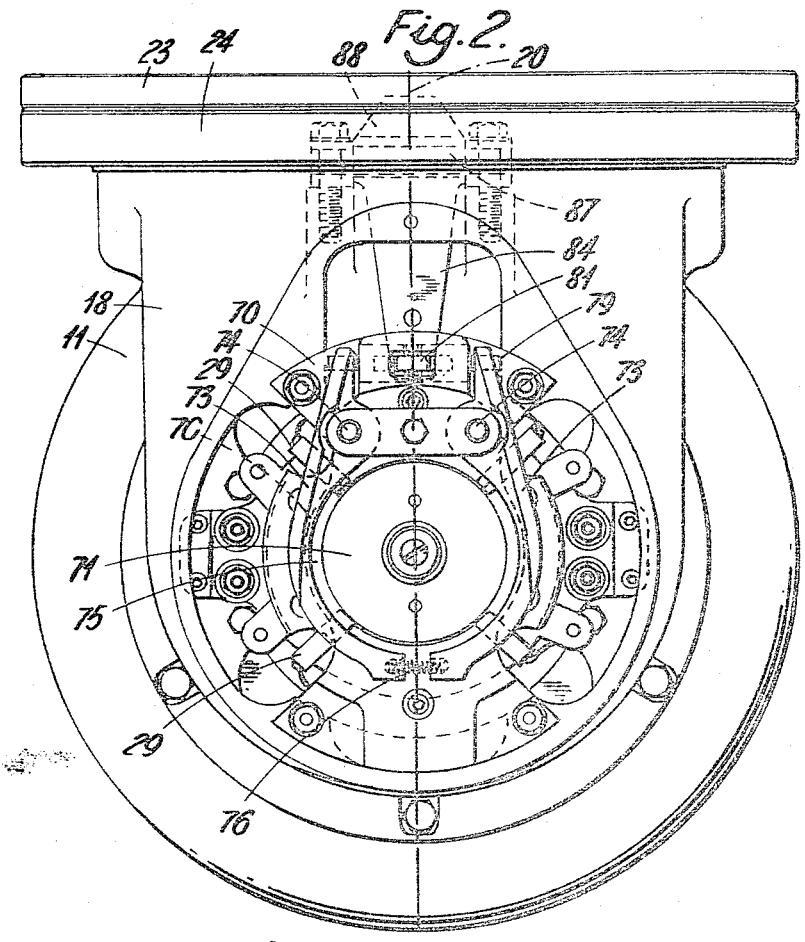
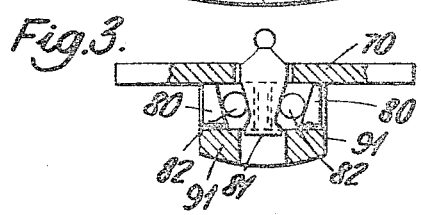

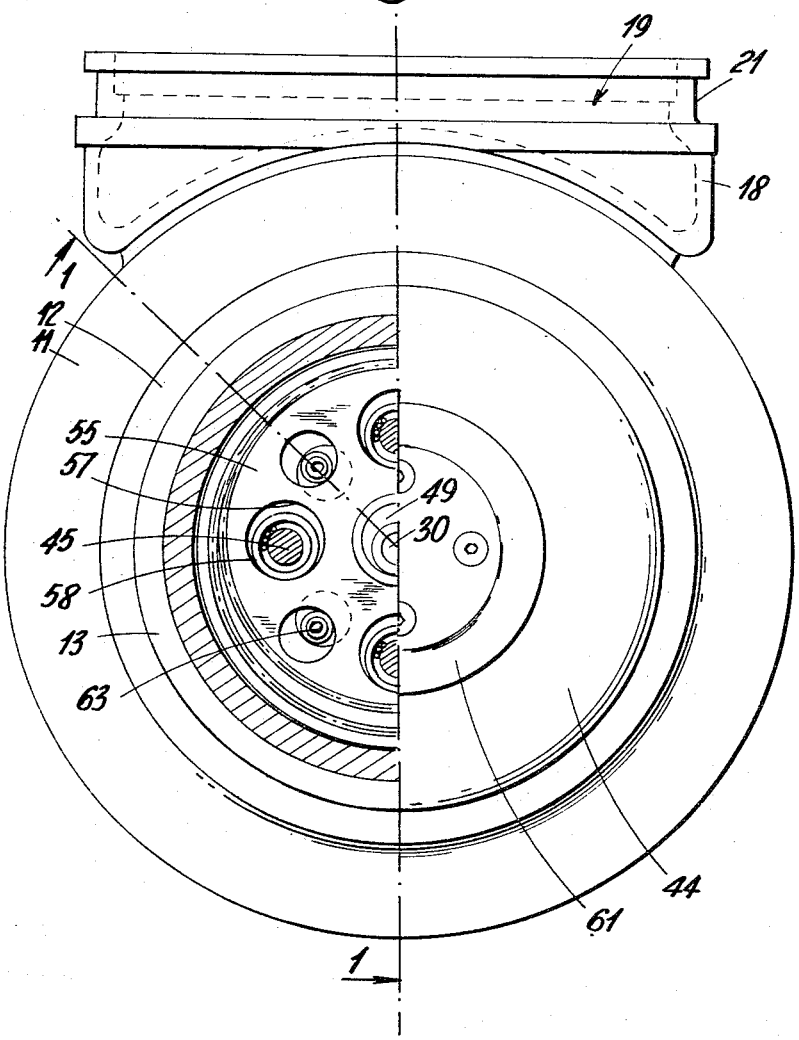

United States Patent Office 3,370,668
Patented Feb. 27, 1968

3,370,668
MOTOR DRIVEN TRUCKS
Cecil Goodacre, Basingstoke, England, assignor to Lansing Bagnall Limited, Basingstoke, England, a British company
Filed Feb. 2, 1966, Ser. No. 524,581
Claims priority, application Great Britain, Feb. 3, 1965, 4,742/65
6 Claims. (Cl. 180—52)

ABSTRACT OF THE DISCLOSURE

A motor drive for use as an industrial truck drive comprises a ground wheel and an electric motor and a housing therefor mounted in the interior of the ground wheel. The motor housing carries bearings for a sleeve surrounding the housing, which sleeve is driven by the motor and forms part of the ground wheel. There is also an epicyclic gear system between the motor shaft and the driven sleeve, which gear system comprises eccentrics on the motor shaft, and intermediate gear members in mesh with the eccentrics and an internally toothed annulus fixed to one end of the motor housing, the gear members being eccentrically mounted on spindles carried by an extension of the driven sleeve.

---

This invention comprises improvements in or relating to motor driven trucks and has particular reference to motor drives of the type which are intended to be used as industrial truck drives through a gear system to a steerable ground wheel.

It is an object of the invention to provide a more compact and convenient drive of this type than that which is disclosed in our British Patent No. 780,487 which is in use on a wide scale but involves a motor located in a framework above the ground wheel and connected thereto by gearing carried on the framework so that the whole construction occupies a considerable amount of room in the direction of height.

According to the present invention a motor drive for use as an industrial truck drive through a gear system to a rotatable ground wheel comprises in combination a ground wheel, a rotatable mounting therefor and an electric motor in which the motor is mounted coaxially with the ground wheel, the motor housing is located in the interior of the ground wheel, one end of the motor housing carries an internally toothed annulus, which annulus is concentric with the axis of the motor shaft and remains in fixed relation with the motor housing during use of the motor drive, the motor housing carries bearings for a driving sleeve concentric with the housing and the annulus, which sleeve extends around the motor housing and is rotatable relatively thereto and supports or forms part of the ground wheel, and the driving sleeve is extended inwardly around the end of the toothed annulus and carries planet spindles which rotate within the annulus around the axis of the motor shaft and wheel and constitute the driven members of an epicyclic drive system of which the shaft is the driving member and the annulus the reaction member.

It is preferred that the mounting for the ground wheel is provided with means by which it can be steered whereby the wheel is a steerable wheel.

It is also preferred that the said drive system comprises eccentrics on the motor shaft which carry intermediate outwardly toothed gear members meshing with the internally toothed annulus and there are driving connections between the intermediate gear members and the planet spindles which transmit the drive to the planet spindles while permitting eccentric motion of the intermediate gear members. In this case each driving connection may comprise a sleeve mounted concentrically and rotatably on its associated planet spindle and eccentrically within an aperture provided in each of the aforesaid intermediate gear members, the arrangement being such that at any one time during use of the motor drive, each of the intermediate gear members will be in driving engagement with at least one of the said sleeves and hence cause the planet spindles to be driven.

In one form of the invention brake gear is located on the other end of the motor shaft to that end of the shaft which is in engagement with the said driving system, the motor being disposed between said brake gear and said driving system.

Preferably the ground wheel, motor, driving system and, if provided, brake gear are constructed such that they are all kept within the area of an imaginary vertical cylinder bounded by the wheel tyre when the wheel is steered.

The brake gear may comprise a drum brake, the moving brake shoes being simultaneously operable by a wedge device from a push member located on the axis of the rotatable mounting, by means of an intermediate linkage.

By way of example, a motor drive in accordance with the invention will now be described with reference to the accompanying drawings in which:

FIGURE 2 is an end elevation of the motor drive shown in FIGURE 1 with the cover removed to show the brake gear;

FIGURE 3 is a plan view of part of the brake gear to show the wedge-device thereof;

FIGURE 4 is a part end elevation, part sectional view, the sectional part being taken along line 3—3 in FIGURE 1.

Figure 1:
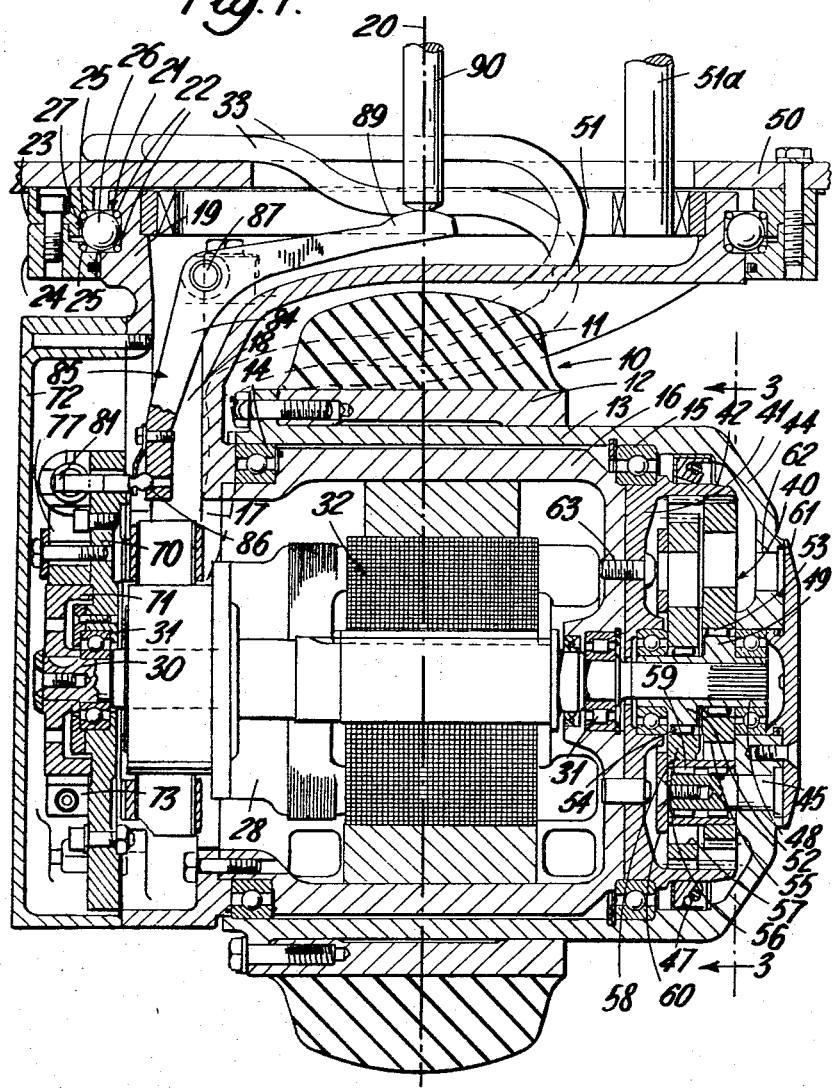
FIGURE 1 is an elevational cross-section of the motor drive, the drive being attached to the body of an industrial truck and the gear box part of the drive being sectioned along line 1—1 in FIGURE 4.
Figure 5:
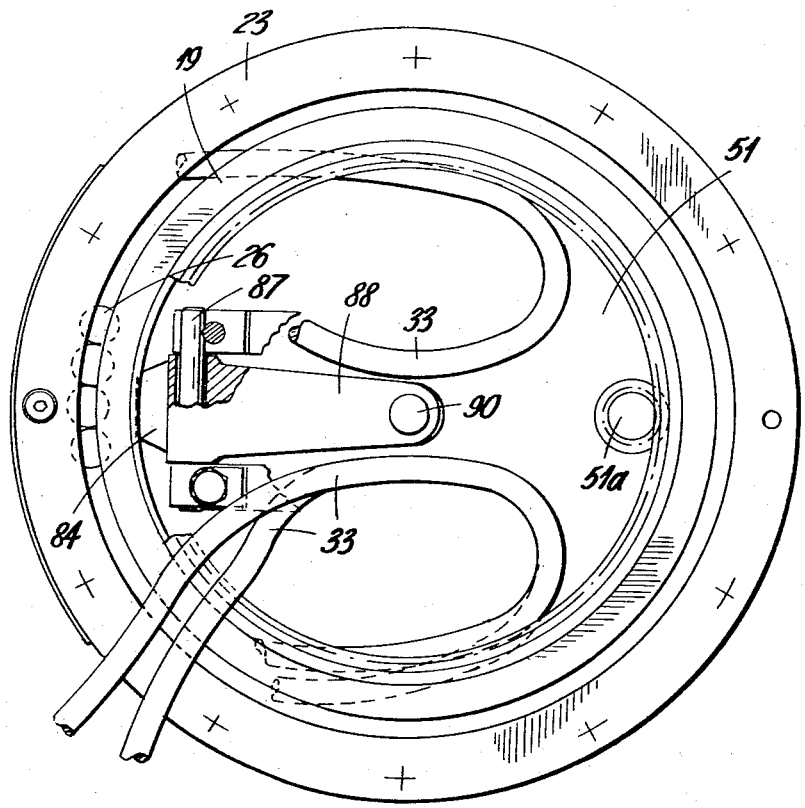
FIGURE 5 is a plan view of the motor drive shown in FIGURE 1.

With reference to the drawings, a ground wheel 10 comprises a solid rubber tyre 11 moulded on and bonded to an internal rim member 12 which takes the form of a metal annulus which is as thin in a radial direction as is consistent with the requisite stiffness and is internally machined to fit over a driving sleeve 13. The driving sleeve 13 runs on annular ball bearings 14, 15 fitted to a fixed motor housing 16 and the motor housing extends beyond the sleeve at one end where it is attached to a stout cylindrical element 17 from which there extends upwardly a short bracket 18 which terminates in a horizontal steerable ring mounting 19, the central vertical axis 20 of which coincides with the centre of the tyre 11. The ring 19 is recessed at 21 to receive two circular hardened steel wire rings 22 one of them seated in the bottom corner of the recess and the other seated above it in the top corner of the recess. Around the steerable ring 19 are two fixed horizontal rings 23, 24 which are screwed together and are recessed to receive two other hardened steel wire rings 25. The fixed rings 23, 24 are screwed to the part 50 of the body of an industrial truck to which the wheel 10 is to be attached. Large balls 26 run in the raceway 27 which is formed between the four hardened steel wire rings 22, 25 and the balls form the means of transmitting the load from the truck to the wheel.

The steerable ring 19 is internally toothed and meshes with the steering pinion 51 and steering gear 51a carried on the body of the truck and in this way the whole motor housing 16 and the wheel 10 mounted thereon can be steered.

Within the motor housing 16 there is the motor which comprises fixed field magnets 28, brush gear comprising four brushes 29 (see FIGURE 2) and a motor shaft 30 which is supported at each end by bearings 31 and which carries an armature 32 which is rotatable therewith. Electrical leads 33 to the field magnets 28 and brushes 29 are provided and these leads pass inside the steering mounting 19 and the cylindrical element 17 and are secured by means (not shown) to a fixed part, i.e., the part 50 of the body of the truck, at a point which is as near as possible to the steering axis 20 to minimise the movement or flexing of the leads when the wheel is steered.

At the opposite end of the housing 16 from that end which is attached to the stout cylindrical element 17 there is arranged a gear box 40. This gear box consists of a disc-like plate 41 detachably secured to the end of the motor housing 16 and an internally toothed annulus or ring gear 42 formed in one piece with the plate 41 and extending in a direction away from the motor housing 16. Surrounding the motor housing 16 and the annulus 42 is the driving sleeve 13 which carries the ground wheel 10. The end of the sleeve which is adjacent the annulus is extended longitudinally and inwardly to constitute a rotating gear box casing 44 and it carries four cylindrical pivots 45 which project from it into the space within the toothed annulus 42 and which form planet bearings for an epicyclic drive system hereinafter described. Between the sleeve 13 and the exterior of the annulus 42 there is an oil seal 47.

On the motor shaft 30 there is a splined sleeve 48 which carries two eccentrics 49, 52 formed in one with it and arranged in opposite phase. On the eccentrics 49, 52 there are roller bearings 53, 54 which support gear members 55, 56 respectively. Each gear member is of sufficient size to mesh with the internally toothed annulus 42 and has openings 57 cut in it which are large enough to pass the pivots or planet spindles 45. The planet spindles are engaged with each gear member by sleeves 58 mounted, on annular roller bearings 59, upon them and thereby permit radial movement of the gear members 55, 56 on the eccentrics 49, 52 while ensuring that the planet spindles 45 are carried around the gear members. The inner ends of the planet spindles 45 are connected to an annular plate 60 which prevents axial movement of the gear members.

This gear box 40 has an axial length which is very small in relation to the power transmitted and the exterior of the sleeve 13 is shaped so as to be part spherical, i.e. the part 44, and to lie within an imaginary vertical tube or an imaginary sphere traced out by the rubber tire 11 of the ground wheel 10 when it performs its steering movements. Therefore the gear box adds nothing to the overall dimensions demanded by the ground wheel itself. The end of the rotating gear box casing provided by the inwardly-curved portion 44 of the sleeve 13 carries a removable cover plate 61 and the cover plate overlies holes 62 in the end portion 44 of the sleeve which can be made to coincide with apertures in the gearing which pass right through the gear box from side to side in certain positions of the gear members 55, 56 and afford access to fixing screws 63 for the plate 41 on which the annulus 42 is formed. These screws 63 secure the plate and the annulus to the motor housing 16. Therefore if the screws 63 are undone the gear box 40 with its splined eccentric drive 48 and the outer rotating sleeve 13 with the wheel 10 can be withdrawn by sliding it off the outer races 14, 15 mounted to support the sleeve 13 on the exterior of the motor housing 16.

At the other end of the motor, the motor shaft 30 carries one of the ball bearings 31 located in a plate 70 removably fixed to the tubular end of the motor housing. The motor shaft 30 also carries beyond the plate 70, a brake drum 71 which is provided with a cover 72. Within this cover 72 there are secured two brake shoes 73. The brake shoes are pivoted on spindles 74 above the brake drum 71 and between ears 77 bolted to the plates 70 and they hang down from their pivots one on each side of the brake drum 71 and are curved and carry brake linings 75 to engage the drum. At their lower ends they are urged away from the drum by a spring 76. Above their pivots they extend upwardly between the said ears 77 and they carry adjusting screws 79 which engage slidable brake-applying members 80. The brake-applying members 80 slide in a horizontal direction in guides defined by blocks 91 formed on the plate 70 and between the members 80 there is a space which is partly occupied by a central wedge 81. Between each face of the wedge 81 and the sliding brake-applying members 80 there are rollers 82 and if the wedge is urged outwardly (i.e. to the left as viewed in FIGURE 1) the upper ends of the pivoted brake shoes 73 are urged outwardly and their lower curved portions which carry the brake linings 75 are urged inwardly onto the brake drum 71. The wedge-shaped member 81 which is used to apply the brake passes inwardly into a space provided in the motor housing into which there depends one arm 84 of a bell crank lever 85. The lower end of this arm has a V-notch 86 which engages the wedge-shaped brake-applying member 81. The pivot 87 of the bell crank lever 85 is carried on the upstanding bracket 18 which terminates in the steering mounting 19. The other arm 88 of the bell crank lever 85 extends above the tyre 11 of the wheel 10 to a point which is in line with the centre of the steering movement and its upper surface 89 is curved and hardened. It is engaged on the steering axis 20 by a downwardly depending brake-applying rod 90 concentric with the steering axis 20 and this rod 90 can be operated by any means desired on the body of the truck, preferably by an equalising lever which ensures that if there is a second motor driven wheel the brake shoes on both wheels are equally applied at all times. The brake gear and its cover 72 are also formed so that they lie within the said imaginary vertical tube or sphere traced out by the motor tyre 11 of the ground wheel when it performs its steering movement.

The invention is not restricted to the specific details of the motor drive as described above. For example, the mounting ring 19 need not necessarily be formed such that it can be connected to the steering pinion 51 of the truck, but only such that it comprises a rotatable mounting for the ground wheels which may be connected to another steerable ground wheel.

I claim:

1. A motor drive for use as an industrial truck drive through an epicyclic gear system to a rotatable ground wheel comprising in combination a ground wheel, a rotatable mounting therefor, an electric motor and a housing for the motor, both the motor and its housing being mounted coaxially with the ground wheel and located in the interior of the ground wheel, bearings carried by the motor housing for a sleeve driven by the motor and concentric with the motor housing, which sleeve extends around the motor housing and it rotatable relatively thereto and supports or forms part of the ground wheel, and an epicyclic gear system between the motor shaft and the said driven sleeve, which gear system comprises eccentrics on the motor shaft which carry outwardly toothed gear members that are eccentrically mounted on spindles and that mesh with an internally toothed annulus carried by one end of the motor housing, which annulus is concentric with the axis of the motor shaft and remains in fixed relation with the motor housing during rotation of the motor shaft, the said spindles being carried by an extension of the driven sleeve that extends inwardly around the end of the said annulus and which spindles are driven around the axis of the motor shaft and the ground wheel by the aforesaid gear members eccentrically mounted on the spindles, the spindles thereby constituting the driven members of the epicyclic gear system of which the motor shaft is the driving member and the said internally toothed annulus the reaction member.

2. A motor drive as claimed in claim 1 in which the mounting of the outwardly toothed gear members on the spindles comprises a sleeve mounted concentrically and rotatably on its associated spindle and eccentrically within an aperture provided in each of the gear members, the arrangement being such that at any one time during rotation of the motor shaft, each of the gear members is in driving engagement with at least one of the said sleeves thereby causing the spindles to be driven.

3. A motor drive as claimed in claim 1 in which brake gear is located on the other end of the motor shaft to that end of the shaft which comprises the driving member of the epicyclic gear system, the motor being disposed between said brake gear and said epicyclic system, and in which the brake gear is a drum brake, the moving brake shoes being simultaneously operable by a wedge device from a push member located on the axis of the rotatable mounting, by means of an intermediate linkage.

4. A motor drive as claimed in claim 3 in which the wedge device is located between the adjacent ends of the brake shoes or extensions thereof, each brake shoe being pivoted at a point between the operative part of the shoe and the wedge device so that insertion of the device between the said adjacent ends of the shoes will apply the brake.

5. A motor drive as claimed in claim 1 in which brake gear is located on the other end of the motor shaft to that end of the shaft which comprises the driving member of the epicyclic gear system, the motor being disposed between said brake gear and said epicyclic gear system, and in which the ground wheel, motor, epicyclic gear system and brake gear are constructed such that they are all kept within the area of an imaginary vertical cylinder bounded by the wheel tyre when the wheel is steered.

6. A motor drive as claimed in claim 1 in which the rotatable mounting for the ground wheel is a ring forming the inner ring of a ball bearing, the outer ring being stationary during use and comprising means for securing the motor drive to the body of an industrial truck and the race-way for the balls of the ball bearing being formed from four hardened wire rings mounted in grooves or recesses in the inner and outer rings of the ball bearings so that they form the four corner points of a square-sectioned tube within which the balls are able to run.

References Cited

UNITED STATES PATENTS

| | | | |
|---|---|---|---|
| 3,160,032 | 12/1964 | Black | 74—804 |
| 3,163,250 | 12/1964 | Gibson | 180—65 X |
| 3,302,739 | 2/1967 | Beck et al. | 180—65 |

FOREIGN PATENTS

| | | |
|---|---|---|
| 915,658 | 1/1963 | Great Britain. |
| 939,079 | 9/1963 | Great Britain. |

LEO FRIAGLIA, *Primary Examiner.*

MILTON L. SMITH, *Examiner.*